Dec. 4, 1934.    R. H. BANKS    1,982,850
METHOD OF MAKING METAL FITTINGS
Filed Sept. 8, 1931

INVENTOR
Reeve H. Banks,
By Archworth Martin,
Attorney.

Patented Dec. 4, 1934

1,982,850

UNITED STATES PATENT OFFICE 1,982,850

METHOD OF MAKING METAL FITTINGS

Reeve H. Banks, Pittsburgh, Pa.

Application September 8, 1931, Serial No. 561,523

3 Claims. (Cl. 29—148.2)

My invention relates to the manufacture of pipe fittings and the like, and is particularly useful in the making of fittings of non-corrosive and heat-resisting alloys such as various well-known chrome nickel alloys and others.

Fittings produced by my method are particularly suitable for use where it is necessary that there be no corrosion of the parts and that they be non-porous, as for example, in the case of parts employed in the construction of cream separators and the like, where contamination through corrosion of the metal or accumulation of waste in crevices or porous bodies must be avoided.

Various ways in which my invention may be practised are shown in the accompanying drawing wherein—

Figure 1:
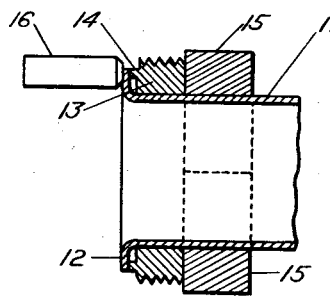
Figure 2:
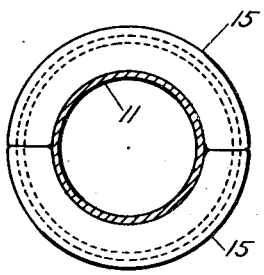
Figure 3:
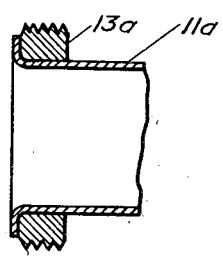
Figure 4:
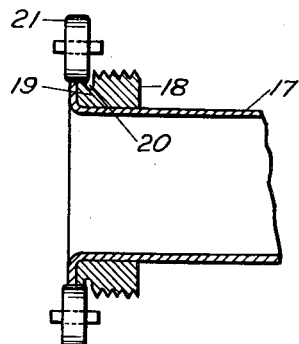
Figure 5:
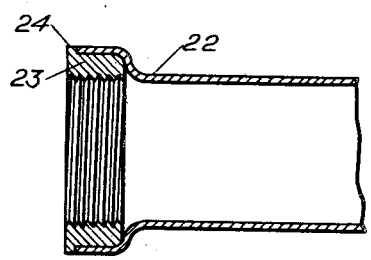
Figure 6:
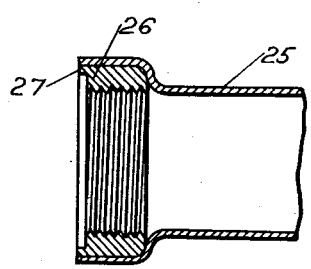
Figure 7:
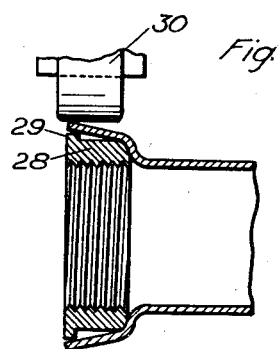
Figure 8:
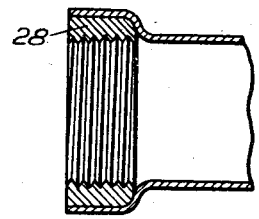
Figure 9:
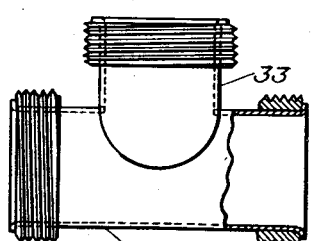
Figure 10:
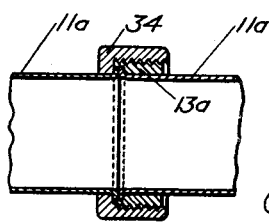

Figure 1 is a longitudinal sectional view showing the manner in which a threaded collar or sleeve may be welded to a pipe end; Fig. 2 is a view looking from the right hand side of Fig. 1; Fig. 3 is a sectional view showing a fragmentary portion of a completed fitting; Fig. 4 shows a modification of the arrangement of Fig. 1, with the welding electrodes applied to the periphery of the fittings instead of being applied in axial directions; Fig. 5 shows a modification of the structure of Fig. 3, with the threaded member located interiorly of the pipe; Fig. 6 shows a modification of the structure of Fig. 5; Fig. 7 shows still another modification, of a partially-formed fitting; Fig. 8 shows the fitting of Fig. 7 in completed form; Fig. 9 shows a T fitting constructed according to my invention, and Fig. 10 shows coupled fittings.

Referring first to Figs. 1 and 2, I show a portion of a tube 11 that may be of suitable alloy metal as above-explained. In order to permit the connection of this tube to another tube or fitting, I upset or flare the end of the tube to provide a flange or shoulder 12. A threaded collar 13 surrounds the tube and has an annular bead 14. The collar may be of alloy or ordinary steel, as conditions may require. For example, if only the interior of the pipe 11 is subjected to corrosive conditions the collar could be of ordinary steel.

Semi-cylindrical electrodes 15 are brought to bear against the rear side of the collar 13, while an electrode 16 is placed against the forward side of the flange 12. A suitable electric circuit is provided for the electrodes and pressure is applied to the electrodes in directions axially of the pipe during the application of welding current. The welding current heats the flange 12 and bead 14 to welding temperature, the bead, by reason of its small cross sectional area being softened sufficiently to flow and fill the annular space between collar 13 and flange 12, the metal of the bead tending to flow inwardly rather than outwardly, because the inner periphery of the bead is not exposed to the chilling effect of the atmosphere. The electrode 16 may be moved along the flange 12 during a welding operation or a single large electrode could be substituted for the electrode 16, so that the complete circular weld could be effected at a single operation.

In Fig. 3 a threaded collar 13a is shown as welded to a pipe end 11a. This structure may be formed from a beaded collar such as 13, or the collar 13a may not initially have a bead such as the bead 14, but may be simply welded to the flange of the pipe by electrodes similar to the electrodes 15 and 16.

In Fig. 4, I show a pipe 17 formed similarly to the pipe 11, but in this case the collar 18 has a peripheral bead 19 that is partially separated from the threaded portion of the collar by an annular groove 20. Roller electrodes 21 are caused to move circumferentially to the pipe flange and bead during the application of welding current, either by rotating the rollers or rotating the pipe. The provision of the groove 20 results in concentration of the welding heat within the bead 19 and the pipe flange to a greater degree than if the groove were not provided.

It will be seen that the threaded collars of Figs. 1 to 4 need not necessarily have fluid-tight connection with the pipe ends, since the flanged ends of the pipe are brought into direct engagement with similarly flanged ends of other pipes, as shown in Fig. 10. It is therefore necessary only that the welds be of sufficient length or area to prevent rotative movement of the threaded collars on the pipes when a pipe coupling 34 is being screwed on the collar.

In Fig. 5, I show a pipe 22 that is enlarged at its outer end for the reception of a sleeve or collar 23 that is internally threaded. The collar 23 has a peripheral bead 24 and welding current may be supplied to the bead and the abutting end of the pipe by roller electrodes such as those shown in Fig. 4.

In Fig. 6, I show a pipe 25 that has an internal collar 26, the collar being provided with a bead 27. The bead 27 may be welded to the collar by means of electrodes such as those shown in Fig. 1.

In Fig. 7, a collar 28 is shown that has a peripheral bead 29. Welding current supplied through roller electrodes 30 causes softening of the bead 29 so that it will be flattened and spread during the welding operation and during compression of the pipe between the electrodes 30, so that the completed product is formed as shown in Fig. 8.

Referring now to Fig. 9, I show a T fitting whose ends have externally threaded collars formed in a suitable manner as in Figs. 1 to 4, but which ends could of course have internal threads as in Figs. 5 to 8. The head or body 32 of the T has welded thereto the stem 33.

Previous to assembling the parts 32 and 33 the member 32 has one side thereof cut away to a depth of approximately one-half its diameter, and the inner end of the stem 33 is cut on curves complemental to the curved lines upon which the cut has been made in the member 32. Thereupon the parts 32 and 33 are brought together and their abutting edges welded through the application of current from suitable electrodes, or otherwise.

The collars of the various fittings may be threaded either before or after they are welded in place.

I claim as my invention:—

1. The method of making metal fittings, which comprises flaring an end of a pipe, placing a beaded collar in position coaxially of the pipe with its bead against said flared portion, and welding said bead to said portion by passing an electric current through the bead and the metal of the pipe and simultaneously compressing the heated parts to effect flattening of the bead.

2. The method of making metal fittings which comprises placing a pipe member and a collar member in co-axial relation, one of said members having a protruding portion whose edge is in contact with the other member, and applying welding heat and pressure to the said members to soften and flatten the said protruding portion while welding it to the other member.

3. The method of making metal fittings which comprises flaring an end of a pipe member, placing a collar member circumferentially of the pipe, the collar having a protruding portion in contact with the flared wall of the pipe, applying welding heat and pressure to the said members to soften and flatten the protruding portion while welding it to the pipe member, and simultaneously moving the collar toward the flared end.

REEVE H. BANKS.